Sept. 6, 1938.  C. H. ANGELL  2,128,897
CONVERSION OF HYDROCARBON OILS
Original Filed March 17, 1933
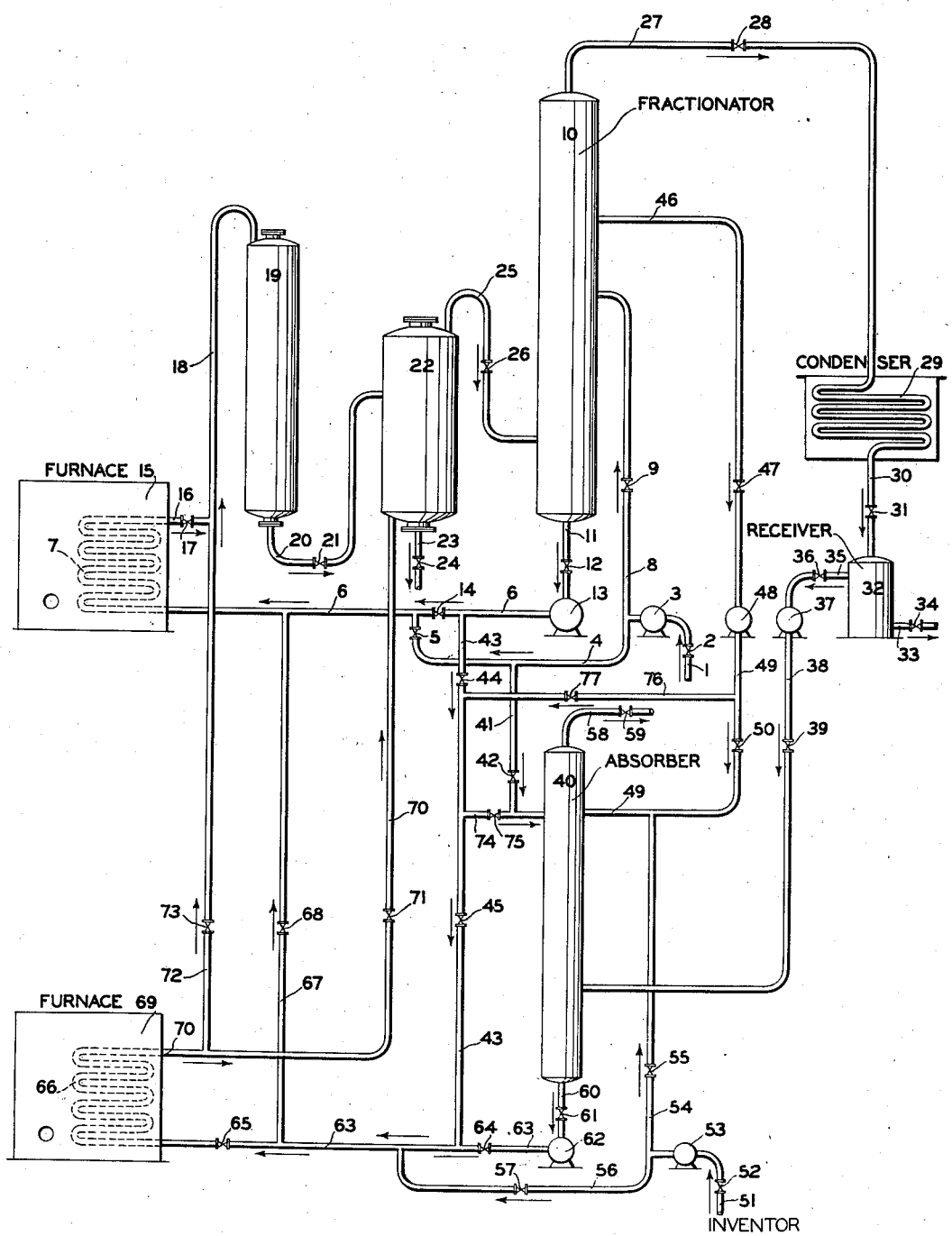
INVENTOR
CHARLES H. ANGELL
BY Frank L. Belknap
ATTORNEY Patented Sept. 6, 1938

2,128,897

UNITED STATES PATENT OFFICE 2,128,897

CONVERSION OF HYDROCARBON OILS

Charles H. Angell, Chicago, Ill., assignor to Universal Oil Products Company, Chicago, Ill., a corporation of Delaware Application March 17, 1933, Serial No. 661,242
Renewed December 6, 1935

11 Claims. (Cl. 196—9)

This invention particularly refers to an improved process and apparatus for the conversion of hydrocarbon oils to produce high yields of low boiling distillate, such as motor fuel of high anti-knock value, wherein the gaseous products of the cracking operation are subjected to absorption for the recovery of liquefiable components and wherein the enriched absorber oil, containing said recovered liquefiable components, is subjected to further conversion in the same cracking system for the production of additional yields of good quality motor fuel.

The present invention offers several alternative methods of operation with respect to the material utilized as absorber oil for the recovery of the desirable liquefiable components from the gaseous products of the process and with respect to the method whereby the enriched absorber oil is subjected to conversion. These alternative methods are, however, not to be considered equivalent, the object being to select the alternative method best suited for the particular oil undergoing treatment, the operating conditions to which it is subjected and the desired results, as will be later more fully described.

In one specific embodiment of the present invention the lean absorber oil utilized to recover the desirable liquefiable components from the gaseous conversion products of the process comprises a portion or all of the raw oil charging stock for the cracking system, while in another embodiment of the invention the absorber oil chosen for this purpose may be all or a selected fraction of the reflux condensate, which comprises the insufficiently converted intermediate conversion products of the process, or it may comprise a selected fraction of both the intermediate conversion products and the raw oil charging stock or, in accordance with another embodiment of the invention, an absorber oil of the desired characteristics from any suitable external source may be employed, in which latter case the absorber oil, in its enriched state, comprises a secondary charging stock for the process.

Depending upon the characteristics of the enriched absorber oil, it may be subjected to conversion in the same heating coil to which the other materials to be subjected to conversion in the same cracking system are supplied or a separate heating coil may be employed for the treatment of the enriched absorber oil wherein it may be subjected to either milder or more severe conversion conditions, as desired. It is also within the scope of the invention when a secondary low-boiling charging stock is employed as the absorber oil to subject the enriched absorber oil and reflux condensate or the enriched absorber oil and a selected low-boiling fraction of the reflux condensate from the fractionator of the cracking system to conversion in one heating coil and to employ a separate heating coil for the treatment of the higher boiling primary charging stock or the primary-charging stock and the high-boiling fractions of the reflux condensate.

I am aware that it is not new to utilize raw oil charging stock for a cracking operation or intermediate conversion products of the process as absorber oil for the recovery of liquefiable components from the gaseous conversion products of the process, many processes disclosing this feature having been proposed. However, in all such cases wherein the absorber oil is subjected to conversion within the system, the enriched absorber oil is first either intentionally or incidentally subjected to vaporization whereby all or a portion of the liquefiable components recovered from the gases are revaporized and liberated from the absorber oil, prior to its conversion. This is a major point of difference between the present invention and the prior art as in each embodiment of the present invention, regardless of the particular material utilized as absorber oil and regardless of the conditions under which the enriched absorber oil is subjected to conversion, the liquefiable components recovered from the gases are intentionally subjected to conversion, together with and under the same conditions afforded the higher boiling components of the enriched absorber oil as I have found that this method of treatment results in the production of increased yields of motor fuel of improved anti-knock value.

The present invention further differs from previously proposed processes wherein gaseous products of the cracking operation, including low-boiling hydrocarbons such as methane and ethane are returned to the same heating coil of the cracking system to which the raw oil charging stock or reflux condensate or both are supplied, being subjected therewith to the same conditions of treatment as those afforded the higher boiling oils. In the present invention, preferably only the relatively high-boiling absorbable components of the gases such as propanes, butanes, pentanes, hexanes and their corresponding olefins, as well as entrained higher boiling hydrocarbons within the range of gasoline are recovered from the gases by the absorber oil and subjected to conversion therewith. That this practice is an improvement over the prior art is evidenced by the improved results which may be accounted for by the fact that the lower boiling components of the gases such as methane and ethane, for example, will not undergo appreciable conversion under the conditions of treatment to which it is desirable to subject ordinary cracking stocks, the low-boiling components of the gases simply serving to increase the burden on the heating coil and decrease the capacity of the process.

The accompanying diagrammatic drawing illustrates one specific form of apparatus in which any of the alternative methods of operation above described may be carried on.

Raw oil charging stock for the process may be supplied through line 1 and valve 2 to pump 3 to be fed therefrom through line 4, valve 5 and line 6 direct to heating coil 7 or it may be supplied, all or in part, from line 4 through line 41, valve 42 and line 74 into absorber 40, as will be later more fully described, or a portion or all of it may pass through line 8 and valve 9 into fractionator 10. The raw oil supplied to fractionator 10 comes into direct contact with the hot vaporous conversion products in this zone, serving to assist their fractionation and may collect, together with the reflux condensate, which comprises the insufficiently converted components of the cracked vapors condensed by fractionation, in the lower portion of fractionator 10 to be withdrawn therefrom through line 11 and valve 12 to pump 13 by means of which the reflux condensate or reflux condensate and raw oil, as the case may be, is fed through line 6 and valve 14 to conversion in heating coil 7.

A furnace 15 of any suitable form encloses heating coil 7 and furnishes the required heat to the oil passing through this zone, to bring it to the desired conversion temperature, preferably at a substantial superatmospheric pressure. The heated oil is discharged from heating coil 7 through line 16, valve 17 and line 18 into reaction chamber 19.

Chamber 19, like heating coil 7, is preferably maintained at a substantial superatmospheric pressure and, although not illustrated in the drawing, is preferably well insulated against the excessive loss of heat by radiation in order that the conversion products from heating coil 7, and particularly their vaporous components, are subjected to continued conversion in this zone. Both vaporous and liquid conversion products are withdrawn from the lower portion of chamber 19 through line 20 and valve 21 to vaporizing chamber 22.

Vaporizing chamber 22 is preferably operated at substantially reduced pressure relative to that employed in chamber 19, whereby latent heat is liberated from the conversion products and further vaporization of the residual liquid is accomplished. When desired, the operating conditions of the process may be so controlled that the only unvaporized residual product remaining in chamber 22 is substantially dry coke. Residual liquid, when such is produced in chamber 22, may be withdrawn through line 23 and valve 24 to cooling and storage or to any desired further treatment. When coke is produced as the residual product of the process it may be allowed to accumulate in chamber 22, to be removed therefrom after the operation of the chamber is completed and, when desired, a plurality of coking chambers, similar to chamber 22 but not illustrated in the drawing, may be employed and they may be operated simultaneously or, preferably, are alternately operated, cleaned and prepared for further operation in order that the duration of the operating cycle of the process will not be limited by the capacity of the coking chambers. Line 23 and valve 24 may also serve as a drain-line and as a means of introducing water, steam or other suitable cooling medium into the coking chamber to hasten cooling and facilitate the removal of the coke.

The vaporous products of the cracking and flash distilling or coking operations pass from chamber 22 through line 25 and valve 26 to fractionation in fractionator 10, wherein their insufficiently converted components are condensed as reflux condensate, to be returned, as already described, to heating coil 7 for further conversion or, when desired, all or a portion of the total or a selected fraction of the reflux condensate may be otherwise treated, as will be later more fully described.

Fractionated vapors of the desired end-boiling point, preferably comprising motor fuel of high anti-knock value, are withdrawn, together with gaseous products of the process, from the upper portion of fractionator 10 through line 27 and valve 28 to be subjected to condensation and cooling in condenser 29. The resulting distillate and gas passes through line 30 and valve 31 to be collected in receiver 32. Distillate may be withdrawn from receiver 32 through line 33 and valve 34 to storage or to any desired further treatment. Gaseous products of the cracking operation, including relatively high-boiling absorbable components such as propanes, butanes, pentanes, hexanes and their corresponding olefins and, in most cases, appreciable quantities of entrained higher boiling hydrocarbons within the range of gasoline are withdrawn from receiver 32 through line 35 and valve 36 to pump or compressor 37, by means of which they are supplied through line 38 and valve 39 to absorber 40. When the pressure employed in receiver 32 is greater than that required in absorber 40, pump or compressor 37 may be dispensed with and may be by-passed by well known means, not shown in the drawing.

Absorber 40 comprises any well known form of absorption apparatus such as a column containing, for example, bubble trays, perforated pans, packing or similar means of bringing a liquid absorber oil into direct and intimate contact with the hydrocarbon gases. A portion or all of the raw oil charging stock of the process may be diverted from line 4 and fed through line 41, valve 42 and line 74 into absorber 40, as previously indicated, to serve as a means of absorbing the desirable components from the gases or, when desired, all or a portion of the reflux condensate from fractionator 10 may be diverted from line 6 through line 43, valve 44, line 74, and valve 75 into absorber 40 for the same purpose. When reflux condensate from fractionator 10 is employed as absorber oil it is preferably cooled, prior to its introduction into the absorber by well known means, not illustrated in the drawing. As a special feature of the invention, a selected fraction of the reflux condensate formed in fractionator 10, preferably comprising a relatively low-boiling fraction of the reflux condensate, may be withdrawn as a side-stream from any suitable point in the fractionator, for example, through line 46 and valve 47 to pump 48, by means of which it may be fed through line 49 and valve 50 into absorber 40 to serve as absorber oil. When raw oil charging stock is supplied to fractionator 10 the side stream supplied to pump 48 may comprise a low-boiling fraction of both the reflux condensate and the raw oil. In any case when a side stream from fractionator 10 is utilized as absorber oil it is preferably cooled, by well known means not illustrated, prior to its introduction into the absorber. It is also within the scope of the invention to employ as absorber oil a secondary charging stock of either higher or lower average boiling point than that supplied to pump 3. This material may comprise any suitable oil from an external source and is supplied through line 51 and valve 52 to pump 53 by means of which it is fed, all or in part, through line 54, valve 55 and line 49 into absorber 40, the remainder, if any, being fed through line 56 and valve 57 into line 63 and passing therefrom to further treatment, together with the enriched absorber oil from absorber 40, as will be later more fully described. The stripped gases, preferably comprising some of the propane as well as the lower-boiling hydrocarbons, ethane and methane, and their corresponding olefins, pass from absorber 40 through line 58 and valve 59 to storage or elsewhere, as desired. The enriched absorber oil, preferably containing some of the propane as well as butane, pentane, hexane and higher-boiling hydrocarbons and their corresponding olefins recovered from the process gases, is withdrawn from the lower portion of the absorber through line 60 and valve 61 to pump 62 by means of which it is fed through line 63 and valve 64 either through valve 65 into heating coil 66 or from line 63 through line 67, valve 68 and line 6 to conversion in heating coil 7.

When the enriched absorber oil is a relatively low-boiling oil it is within the scope of the present invention to supply reflux condensate from fractionator 10 to line 63 through line 43 and valves 44 and 45 or to supply a selected low-boiling fraction of the reflux condensate, or of the reflux condensate and raw oil, from line 49 through line 76, valve 77, line 43 and valve 45 to line 63 and to subject the oil thus supplied to line 63 to conversion in heating coil 66 together with the enriched absorber oil.

Heating coil 66 is located within a furnace 69 of any suitable form, by means of which the oil supplied to this zone is heated to the desired conversion temperature, preferably at a substantial superatmospheric pressure. The separate heating coil 66 is ordinarily employed when the enriched absorber oil is of substantially lower average boiling point than the oil supplied to heating coil 7, in order that the enriched absorber oil, instead of being heated under the relatively mild conditions best suited for the treatment of the oil supplied to heating coil 7, may be subjected to more severe conversion conditions which are better suited for the production of maximum yields of the desired low-boiling product, such as motor fuel of high anti-knock value, from the low-boiling enriched absorber oil. This condition may exist when reflux condensate from fractionator 10 or a selected low-boiling fraction thereof or a selected low-boiling fraction of both the reflux condensate and the charging stock supplied to fractionator 10 is utilized as absorber oil. On the other hand, when a high-boiling absorber oil such as a portion or all of the primary charging stock supplied to pump 3 or, when high-boiling oil from an external source supplied to pump 53 is selected for use in absorber 40 the enriched absorber oil will ordinarily be of higher average boiling point than the oil supplied to heating coil 7, in which case, instead of being supplied to heating coil 7, the enriched absorber oil is preferably subjected in heating coil 66 to milder conversion conditions than those employed in heating coil 7. However, when there is no substantial difference in the cracking characteristics of the enriched absorber oil and the oil supplied to heating coil 7, or when, for any other reason, it is not practical to use two heating coils, heating coil 66 may be eliminated and the enriched absorber oil supplied to heating coil 7, to be subjected therein to the same conditions of treatment afforded the other oils supplied to this zone.

The heated oil is discharged from heating coil 66 through line 70 and may be directed through line 72, valve 73 and line 18 into reaction chamber 19 for further treatment in this zone, together with the heated oil from the heating coil 7. When it is desired to coke the residual oil in chamber 22 all or a regulated portion of the heated oil from heating coil 66, instead of passing to chamber 19, may be directed through valve 71, in line 70, into direct contact with the residual material in chamber 22 for the purpose of supplying additional heat thereto and assisting the coking operation. This is particularly advantageous when a relatively low-boiling enriched absorber oil is supplied to heating coil 66 and is heated to a higher conversion temperature than that employed in heating coil 7. Under such conditions it is possible to produce a coke of low volatility in chamber 22 and to materially increase the yields and anti-knock value of the motor fuel product of the process.

When two heating coils are employed the conversion temperature utilized at the outlet from the heating coil to which the relatively high-boiling oils are supplied is preferably within the range of 850 to 950° F., and preferably a superatmospheric pressure of the order of 100 to 500 pounds, or thereabouts, per square inch is employed at the outlet from this coil while higher conversion temperatures of the order of 900 to 1050° F., and a super-atmospheric pressure within the range of 200 to 800 pounds, or thereabouts, per square inch are preferred at the outlet from the heating coil to which the relatively low-boiling oils are supplied. When a single heating coil is employed any temperatures and pressures within the range of those above given may be utilized. The reaction chamber of the cracking system is preferably operated at a substantial super-atmospheric pressure within the range of 100 to 500 pounds, or more per square inch and preferably the pressure employed in this zone is substantially equalized with that at the outlet from the heating coil employing the lowest pressure, in case two heating coils are operated at different pressures. A substantially reduced pressure relative to that employed in the reaction chamber is preferred in the vaporizing or coking chamber and may range, for example, from 100 pounds or thereabouts per square inch down to substantially atmospheric pressure. The pressure employed in the vaporizing chamber may be substantially equalized or somewhat reduced in the succeeding fractionating, condensing and collecting portions of the system. A superatmospheric pressure of the order of 50 to 150 pounds per square inch is preferred in the absorber, although either higher or lower pressures may be employed in this zone within the scope of the invention.

As a specific example of one operation of the process of the present invention as it may be practiced in an apparatus such as illustrated and above described, the raw oil charging stock to be treated is a 54° A. P. I. gravity Pennsylvania naphtha. A portion of this material is utilized to absorb components of the gaseous products of the process such as pentane, butane, some of the propane and their corresponding olefins as well as any hexane and higher boiling materials contained therein. The enriched absorber oil, together with the remaining portion of the charging stock and reflux condensate from the fractionator of the system is subjected to a conversion temperature of approximately 960° F., at a superatmospheric pressure of about 500 pounds per square inch measured at the outlet from the heating coil. This pressure is substantially equalized in the reaction chamber. A reduced pressure of approximately 50 pounds per square inch is maintained in the vaporizing chamber and is substantially equalized in the succeeding fractionating, condensing and collecting portions of the system. A super-atmospheric pressure of about 85 pounds per square inch is maintained in the absorber. This operation may yield, per barrel of charging stock, about 84% of motor fuel having an anti-knock value equivalent to an octane number of approximately 78, about 2% of low gravity residual oil and about 500 cubic feet of lean gas.

As a specific example of a somewhat different type of operation which may be accomplished within the scope of the present invention in an apparatus such as illustrated and above described, the charging stock is a 30° A. P. I. gravity topped crude which is supplied to the fractionator of the cracking system and there separated, together with the intermediate conversion products of the process (reflux condensate), into low-boiling and high-boiling fractions. The low-boiling fractions of the charging stock and reflux condensate having a boiling range of approximately 400 to 580° F., are utilized as absorber oil while the higher boiling fractions are subjected to a conversion temperature of approximately 900° F., at a super-atmospheric pressure of about 300 pounds per square inch. This pressure is substantially equalized in the reaction chamber and is reduced in the coking chamber to a pressure of about 30 pounds per square inch which pressure is substantially equalized in the succeeding fractionating, condensing and collecting portions of the cracking system, but a superatmospheric pressure of about 100 pounds per square inch is employed in the absorber. The enriched absorber oil is subjected in a separate heating coil to a conversion temperature of approximately 975° F., at a super-atmospheric pressure of about 500 pounds per square inch and the heated oil is introduced into direct contact with the residual material in the coking chamber to assist its reduction to coke. This operation may yield, per barrel of charging stock, about 72% of motor fuel having an anti-knock value equivalent to an octane number of approximately 74, the additional products of the system being about 75 pounds of low volatile coke and about 450 cubic feet of lean gas.

As an example of still another type of operation which may be practiced within the scope of the present invention in an apparatus such as illustrated and above described, two charging stocks are employed, the primary or high-boiling charging stock is a 25° A. P. I. gravity Mid-Continent fuel oil which is subjected, together with reflux condensate from the fractionator of the cracking system, to a conversion temperature of approximately 940° F., at a super-atmospheric pressure of about 250 pounds per square inch. This pressure is substantially equalized in the reaction chamber and is reduced in the coking chamber to a pressure of about 30 pounds per square inch. Substantially the same pressure is employed in the fractionating, condensing and collecting portion of the cracking system. A secondary charging stock comprising kerosene distillate in an amount equivalent by volume to approximately 50% of the primary charging stock is utilized as absorber oil and a super-atmospheric pressure of about 100 pounds per square inch is employed in the absorber. The enriched absorber oil is subjected in a secondary heating coil to a temperature of approximately 960° F., at a super-atmospheric pressure of about 600 pounds per square inch and the heated material is introduced into direct contact with the residual oil in the coking chamber for the purpose of assisting its reduction to coke. This operation may yield, per barrel of total charging stock, about 70% of motor fuel having an anti-knock value equivalent to an octane number of approximately 78, about 70 pounds of low volatile coke and about 550 cubic feet of lean gas.

I claim as my invention:

1. A conversion process which comprises subjecting hydrocarbon oil while flowing in a restricted stream through a heating zone to cracking conditions of temperature and pressure, fractionating the cracked vapors to condense and separate insufficiently cracked fractions thereof, finally condensing the fractionated vapors and separating the resultant condensate from the gases formed by the cracking, scrubbing the gases with reflux condensate formed by the fractionation and absorbing heavier constituents of the gases in such reflux condensate, and subjecting the resultant mixture of reflux condensate and said heavier constituents while flowing in a restricted stream through a second heating zone to more drastic cracking conditions than the oil in the first-named heating zone.

2. A conversion process which comprises fractionating cracked vapors to form primary reflux condensate and a light secondary reflux condensate, finally condensing the fractionated vapors and separating the resultant condensate from incondensible gases, heating the primary reflux condensate to cracking temperature in a heating zone, scrubbing said gases with the secondary reflux condensate and absorbing heavier constituents of the gases in this condensate, heating the resultant mixture of secondary reflux condensate and said heavier constituents in a second heating zone to higher cracking temperature than the primary reflux condensate in the first-mentioned heating zone, and supplying the cracked vapors of the primary reflux condensate and of said mixture to the fractionating step.

3. In a process for converting hydrocarbon oil into relatively low-boiling hydrocarbon oil suitable for use as motor fuel in which a heavy hydrocarbon oil containing residual constituents is subjected to a mild cracking temperature under a high superatmospheric pressure, the products are fractionated to recover a clean condensate, said condensate is separately subjected to more drastic cracking conditions and the products are fractionated to separate gases, naphtha and heavier distillate, the improvements which comprise fractionating said gases to separate them into a lean fraction comprising principally hydrogen and methane and a rich fraction containing a relatively large amount of gaseous olefins, and commingling said rich fraction with the heavy hydrocarbon oil for subjection to said mild cracking temperature and said high superatmospheric pressure to effect a polymerization of gaseous olefins contained in said rich fraction to normally liquid products.

4. In a process for converting hydrocarbon oil into relatively low-boiling hydrocarbon oil suitable for use as motor fuel in which a heavy hydrocarbon oil containing residual constituents is subjected in a first cracking stage to a mild cracking temperature under a high superatmospheric pressure, a clean condensate is subjected in a second cracking stage to more drastic cracking conditions, the products from said first and second cracking stages being delivered to a common evaporator and the vaporous products from said evaporator being fractionated to separate gases, naphtha and heavier condensate, the improvements which comprise fractionating said gases to separate them into a lean fraction comprising principally hydrogen and methane and a rich fraction containing a relatively large amount of gaseous olefins, and commingling said rich fraction with the heavy hydrocarbon oil for subjection to said mild cracking temperature and said high superatmospheric pressure to effect a polymerization of gaseous olefins contained in said rich fraction to normally liquid products.

5. In a process for converting hydrocarbon oil into relatively low-boiling hydrocarbon oil suitable for use as motor fuel in which a heavy hydrocarbon oil containing residual constituents is subjected in a first cracking stage to a mild cracking temperature under a high superatmospheric pressure, the products are fractionated to recover a clean condensate, naphtha and gases, said condensate is separately subjected in a second cracking stage to more drastic cracking conditions and the products are fractionated to separate gases, naphtha and heavier distillate, the improvements which comprise fractionating gases from said first and second cracking stages to separate them into a lean fraction comprising principally hydrogen and methane and a rich fraction containing a relatively large amount of gaseous olefins, and commingling said rich fraction with the heavy hydrocarbon oil for subjection to said mild cracking temperature and said high superatmospheric pressure to effect a polymerization of gaseous olefins contained in said rich fraction to normally liquid products.

6. A hydrocarbon oil conversion process which comprises simultaneously subjecting a relatively heavy oil and a lighter oil to cracking conditions of temperature and pressure in separate heating zones, the lighter oil being subjected to more drastic cracking than the heavy oil, combining the vaporous and gaseous conversion products of said oils and subjecting the resultant mixture to fractionation and condensation to separate gasoline from incondensible gases and fractions heavier than gasoline, fractionating said gases to separate heavier components thereof, including olefins, amenable to conversion into normally liquid products under cracking conditions, and combining such separated heavier components of the gases with said lighter oil for subjection therewith to the more drastic cracking conditions, said heavier components being separated from the gases and combined with the lighter oil by scrubbing the gases with the lighter oil.

7. In a process for converting hydrocarbon oil into relatively low-boiling oil suitable for use as motor fuel in which a heavy hydrocarbon oil is subjected to a mild cracking temperature under high superatmospheric pressure in a first cracking stage, the products fractionated to recover a clean condensate, said condensate separately subjected to more drastic cracking conditions in a second cracking stage and the products fractionated to separate gases, naphtha and heavier distillate, the improvement which comprises fractionating said gases to separate them into a lean fraction comprising principally hydrogen and methane and a rich fraction containing a relatively large amount of gaseous olefins, and supplying said rich fraction to one of said cracking stages for subjection therein to cracking conditions to effect a polymerization of gaseous olefins contained in said rich fraction to normally liquid products.

8. The improvement as defined in claim 7 further characterized in that said rich fraction is supplied to said second cracking stage for subjection to the more drastic cracking conditions employed upon said condensate.

9. The improvement as defined in claim 7 further characterized in that said rich fraction is supplied to said first cracking stage for subjection to said mild cracking temperature and high superatmospheric pressure.

10. A hydrocarbon oil conversion process which comprises simultaneously subjecting a relatively heavy oil and a lighter oil to cracking conditions of temperature and pressure in separate heating zones, the lighter oil being subjected to more drastic cracking conditions than the heavy oil, combining the vaporous and gaseous conversion products of said oils and subjecting the resultant mixture to fractionation and condensation to separate gasoline from incondensible gases and fractions heavier than gasoline, fractionating said gases to separate heavier components thereof, including olefins, amenable to conversion into normally liquid products under cracking conditions, and combining such separated heavier components of the gases with one of said oils for subjection to the cracking conditions employed on said one oil, said heavier components being separated from the gases and combined with said one oil by scrubbing the gases with said one oil.

11. A hydrocarbon oil conversion process which comprises simultaneously subjecting a relatively heavy oil and a lighter oil to cracking conditions of temperature and pressure in separate heating zones, the lighter oil being subjected to more drastic cracking than the heavy oil, combining the vaporous and gaseous conversion products of said oils and subjecting the resultant mixture to fractionation and condensation to separate gasoline from incondensible gases and fractions heavier than gasoline, fractionating said gases to separate heavier components thereof, including olefins, amenable to conversion into normally liquid products under cracking conditions, and combining such separated heavier components of the gases with said heavy oil for subjection to cracking conditions therewith, said heavier components being separated from the gases and combined with the heavy oil by scrubbing the gases with the heavy oil.

CHARLES H. ANGELL.